United States Patent
Yi

(10) Patent No.: US 8,731,563 B2
(45) Date of Patent: May 20, 2014

(54) MOBILE TERMINAL AND MOBILE STATE REPORTING METHOD THEREOF

(75) Inventor: Hongfeng Yi, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 218 days.

(21) Appl. No.: 13/375,887

(22) PCT Filed: May 31, 2010

(86) PCT No.: PCT/CN2010/073409
§ 371 (c)(1),
(2), (4) Date: Dec. 2, 2011

(87) PCT Pub. No.: WO2010/139262
PCT Pub. Date: Dec. 9, 2010

(65) Prior Publication Data
US 2012/0088509 A1 Apr. 12, 2012

(30) Foreign Application Priority Data
Jun. 3, 2009 (CN) .......................... 2009 1 0086504

(51) Int. Cl.
*H04W 24/10* (2009.01)
(52) U.S. Cl.
USPC ............................ 455/437; 370/228; 370/329
(58) Field of Classification Search
CPC .............................. H04W 36/30; H04W 80/04
USPC ......................................... 455/437; 370/331
See application file for complete search history.

(56) References Cited

U.S. PATENT DOCUMENTS

2009/0247150 A1* 10/2009 Fischer et al. ................. 455/425

FOREIGN PATENT DOCUMENTS

| CN | 1503580 A | 6/2004 |
|---|---|---|
| CN | 101404820 A | 4/2009 |
| JP | 2006-005597 A | 1/2006 |
| WO | 2008112161 A2 | 9/2008 |
| WO | 2008/155915 A1 | 12/2008 |
| WO | 2009073525 A1 | 6/2009 |

OTHER PUBLICATIONS

International Search Report for PCT/CN2009/073409 dated Aug. 25, 2010.
3GPP TSG-RAN WG2#61 bis, R2-081760, Mar. 31-Apr. 4, 2008, Shenzhen, China, Title: UE mobility state reporting, InterDigital, Document for Discussion and Decision.
3GPP TSG-RAN WG2#61, R2-080819, Feb. 11-15, 2008, Sorrento, Italy, Title: Measurement Report of UE Mobility State, Source—Samsung, Document for discussion and decision.
3GPP TSG-RAN WG2#62is, R2-083553, Jun. 30-Jul. 4, 2008, Warsaw, Poland, Huawei, Title: Consideration on mobility state detection criteria in active mode, document for discussion and decision.

* cited by examiner

*Primary Examiner* — Phuoc H Doan
(74) *Attorney, Agent, or Firm* — Banner & Witcoff, Ltd.

(57) ABSTRACT

The present invention discloses a method for reporting a mobility state of a mobile terminal comprising: a User Equipment (UE) evaluating its own mobility state under a Radio Resource Control (RRC) connection state based on a first evaluation parameter sent by an evolved Node B (eNodeB), and obtaining an evaluated first determination result; and the UE reporting the first determination result to the eNodeB through a measurement report message in the RRC connection state. The present invention also discloses a mobile terminal configured to report determination result of its own mobility state to an eNodeB such that the eNodeB can adopt different pertinent processing strategies for UEs in different mobility states, thereby bringing convenience to practical application.

10 Claims, 1 Drawing Sheet

MOBILE TERMINAL AND MOBILE STATE REPORTING METHOD THEREOF

TECHNICAL FIELD

The present invention relates to the mobility state evaluation technique in the mobile communication system, and in particularly, to a mobile terminal and a mobility state reporting method thereof.

BACKGROUND OF THE RELATED ART

The current 3rd Generation Partnership Project (3GPP) protocol defines rules for a User Equipment (UE) in an idle state to determine its own mobility state and a conversion relationship between each mobility state in a long term evolution (LTE) system. This will be specifically described as follows.

If the number of times for the UE to perform cell reselection in a preset time period of $T_{CRmax}$ is greater than a set lower limit times $N_{CR\_M}$ and less than or equal to a upper limit times $N_{CR\_H}$, then it is believed that the UE is in a medium speed mobility state.

If the number of times for the UE to perform cell reselection in a preset time period of $T_{CRmax}$ is greater than the set $N_{CR\_H}$, then it is believed that the UE is in a high speed mobility state.

If the number of times for the UE to perform cell reselection in a preset time period of $T_{CRmaxHyst}$ is greater than less than or equal to the $N_{CR\_M}$, then it is believed that the UE is in a normal mobility state.

The UE detects the number of times of its own cell reselection. If the above determination rule for the high speed mobility state is satisfied, then the UE enters into the high speed mobility state; If the above determination rule for the medium speed mobility state is satisfied, then the UE enters into the medium speed mobility state; If neither the determination rule for the high speed mobility state nor the determination rule for the medium speed mobility state is satisfied, then the UE enters into the normal speed mobility state.

Evaluation parameters used in each of the above determination rules are configured by an evolved NodeB (eNodeB) and are sent to the UE by system broadcast. The UE will select corresponding cell reselection parameters to perform cell reselection after determining its own mobility state based on the determination rules. However, because the eNodeB which is located at a network side is unable to know the UE's determination result for its own mobility state and is unable to directly measure mobile speed of the UE either, the eNodeB is unable to adopt different pertinent processing strategies for UEs in different mobility states when performing frequency offset correction, resource scheduling, destination cell handover, etc., thereby bringing inconvenience to practical application.

SUMMARY OF THE INVENTION

In view of this, a main object of the present invention is to provide a mobile terminal and a mobility state reporting method thereof so as to solve the problem that an eNodeB is unable to know a mobility state of a UE.

In order to achieve the above object, the technical scheme of the present invention, which will be described below, is thus implemented.

The present invention provides a method for reporting a mobility state of a mobile terminal comprising:

a User Equipment (UE) evaluating its own mobility state under a Radio Resource Control (RRC) connection state based on a first evaluation parameter sent by an evolved Node B (eNodeB), and obtaining an evaluated first determination result; and the UE reporting the first determination result to the eNodeB through a measurement report message in the RRC connection state.

The UE evaluating its own mobility state based on the first evaluation parameter and obtaining the first determination result specifically comprises:

the UE obtaining the number of times of changing cells in preset time periods of t-Evaluation of a first timer and t-HystNormal of a second timer, respectively, and comparing the obtained number of times with a preset first lower limit times n-CellChangeMedium and first upper limit times n-CellChangeHigh;

if the number of times for the UE to change cells in the time period of t-Evaluation is greater than the n-CellChangeMedium and less than or equal to the n-CellChangeHigh, determining that the UE is in a medium speed mobility state;

if the number of times for the UE to change cells in the time period of t-Evaluation is greater than the n-CellChangeHigh, determining that the UE is in a high speed mobility state; and if the number of times for the UE to change cells in the time period of t-HystNormal is less than or equal to the n-CellChangeMedium, determining that the UE is in a normal mobility state.

The method further comprises: the UE carrying the first determination result by a new added information element Mobilitystate in the measurement report message, wherein if the first determination result obtained by current evaluation is the high speed mobility state, then the Mobilitystate is set to be High;

if the first determination result obtained by current evaluation is the medium speed mobility state, then the Mobilitystate is set to be Medium; and if the first determination result obtained by current evaluation is the normal mobility state, then the Mobilitystate is set to be Normal.

The method further comprises: the UE evaluating its own mobility state based on a second evaluation parameter sent by the eNodeB through system broadcast before the UE enters into the RRC connection state, and obtaining an evaluated second determination result; and the UE reporting the second determination result to the eNodeB through a RRC connection setup complete message during setting up a RRC connection.

The UE evaluating its own mobility state based on the second evaluation parameter and obtaining the second determination result specifically comprises:

The UE obtaining the number of times of changing cells in preset time periods of $T_{CRmax}$ of a third timer and $T_{CRmaxHyst}$ of a fourth timer, respectively, and comparing the obtained number of times with a preset second lower limit times $N_{CR\_M}$ and second upper limit times $N_{CR\_H}$;

if the number of times for the UE to change cells in the time period of $T_{CRmax}$ is greater than the $N_{CR\_M}$ and less than or equal to the $N_{CR\_H}$, determining that the UE is in a medium speed mobility state;

if the number of times for the UE to change cells in the time period of $T_{CRmax}$ is greater than the $N_{CR\_H}$, determining that the UE is in a high speed mobility state; and if the number of times for the UE to change cells in the time period of $T_{CRmaxHyst}$ is less than or equal to the $N_{CR\_M}$, determining that the UE is in a normal mobility state.

The method further comprises: the UE carrying the second determination result by a new added information element Mobilitystate in the RRC connection setup complete message, wherein:

if the second determination result obtained by last evaluation is the high speed mobility state, then the Mobilitystate is set to be High;

if the second determination result obtained by last evaluation is the medium speed mobility state, then the Mobilitystate is set to be Medium; and if the second determination result obtained by last evaluation is the normal mobility state, then the Mobilitystate is set to be Normal.

After the UE reports the determination result to the eNodeB, the method further comprises: the eNodeB adopting different processing strategies for UEs in different mobility states based on the determination result when performing frequency offset correction, resource scheduling, destination cell handover.

The present invention further provides a mobile terminal comprising:

an evaluating module configured to evaluate a mobility state of the mobile terminal under a RRC connection state based on a first evaluation parameter sent by an eNodeB and obtain an evaluated first determination result; and a result reporting module configured to report the first determination result to the eNodeB through a measurement report message in the RRC connection state.

The evaluating module is further configured to evaluate the mobility state of the mobile terminal based on a second evaluation parameter sent by the eNodeB through system broadcast before the mobile terminal enters into the RRC connection state and obtain an evaluated second determination result.

Accordingly, the result reporting module is further configured to report the second determination result to the eNodeB through a RRC connection setup complete message when the mobile terminal sets up a RRC connection.

The result reporting module is further configured to carry the first determination result by a new added information element Mobilitystate in the measurement report message and carry the second determination result by a new added information element Mobilitystate in the RRC connection setup complete message.

The mobile terminal and the mobility state reporting method thereof in accordance with the present invention allow the UE to report the evaluation result for its mobility state to the eNodeB through the measurement report message in the RRC connection state, or allow the UE in the idle state to report the determination result for the mobility state evaluation to the eNodeB through RRC signaling during cell reselection, in order to provide references for the eNodeB to select a processing strategy corresponding to the UE.

The evaluation of the mobility state may use existing configuration parameters, principles and processing procedures in the protocol without bringing extra processing overhead for the UE. Indexes for evaluating the mobility state are parameters configured by the eNodeB. The eNodeB may unify the UE's and eNodeB's understandings for corresponding relationships between the different high, medium and normal mobility states and speed by the parameter configuration.

When cell handover is performed, the prevent invention is beneficial for the eNodeB to select a destination cell for handover with the corresponding speed attribute for UEs with different mobility states so as to assist the eNodeB to implement the consistence between bearing UE type and cell attribute planning When resources are allocated to the UE, frequency selectivity scheduling and frequency hopping techniques are used respectively for UEs with different mobility states so as to satisfy requirements for different channel states. In addition, the prevent invention is beneficial for the eNodeB to adopt different pertinent frequency offset correction methods for UEs with different mobility states.

PREFERRED EMBODIMENTS OF THE PRESENT INVENTION

The technical scheme of the present invention will be described in further detail in conjunction with the accompanying drawings and embodiments.

Figure 1:
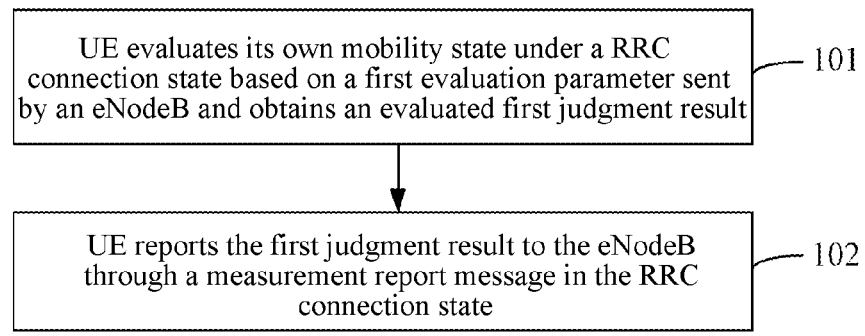
FIG. 1 is a flow chart of a method for reporting a mobility state of a mobile terminal according to the present invention.

The present invention, aiming at the case where an eNodeB is unable to know a mobility state of a UE, proposes a method for report the mobility state of the UE. As shown in FIG. 1, the method mainly comprises the following steps.

Step 101, the User Equipment (UE) evaluates its own mobility state under a Radio Resource Control (RRC) connection state based on a first evaluation parameter sent by the eNodeB and obtains an evaluated first determination result; and The UE evaluates its own mobility state based on the first evaluation parameter sent by the eNodeB through a RRC connection reconfiguration message, and obtains the evaluated first determination result. Specific operations will be described as follows.

The UE obtains the number of times of changing cells in preset time periods of t-Evaluation of a first timer and t-HystNormal of a second timer, respectively, and compares the obtained number of times with a preset first lower limit times n-CellChangeMedium and first upper limit times n-CellChangeHigh.

If the number of times for the UE to change cells in the time period of t-Evaluation is greater than the n-CellChangeMedium and less than or equal to the n-CellChangeHigh, it is determined that the UE is in a medium speed mobility state.

If the number of times for the UE to change cells in the time period of t-Evaluation is greater than the n-CellChangeHigh, it is determined that the UE is in a high speed mobility state.

If the number of times for the UE to change cells in the time period of t-HystNormal is less than or equal to the n-CellChangeMedium, it is determined that the UE is in a normal mobility state.

The values of the t-Evaluation and t-HystNormal may be configured according to practical requirements, and there is no size relationship between the t-Evaluation and t-HystNormal. Of course, their values may also be equal. However, the value of the n-CellChangeHigh should be greater than that of n-CellChangeMedium.

Step 102, the UE reports the first determination result to the eNodeB through a measurement report message in the RRC connection state.

Preferably, under the RRC connection state, the UE reports the first determination result obtained by current evaluation to the eNodeB through the Measurement Report message. Furthermore, an information element Mobilitystate is added in the measurement report message and used to carry the first determination result. Specifically, three cases will be described bellow.

If the first determination result obtained by the current evaluation of the UE is the high speed mobility state, then the Mobilitystate is set to be High.

If the first determination result obtained by the current evaluation of the UE is the medium speed mobility state, then the Mobilitystate is set to be Medium.

If the first determination result obtained by the current evaluation of the UE is the normal mobility state, then the Mobilitystate is set to be Normal.

The new added information element Mobilitystate corresponds to modification in the 3GPP protocol, which is specifically defined as follows:

```
MeasurementReport ::= SEQUENCE {
    criticalExtensions CHOICE {
        c1 CHOICE {
            measurementReport-r8 MeasurementReport-r8-IEs,
            spare7 NULL,
            spare6 NULL, spare5 NULL, spare4 NULL,
            spare3 NULL, spare2 NULL, spare1 NULL
        },
        criticalExtensionsFuture SEQUENCE { }
    }
}
MeasurementReport-r8-IEs ::= SEQUENCE {
    measResults MeasResults,
    nonCriticalExtension SEQUENCE { } OPTIONAL
}
MeasResults ::= SEQUENCE {
measId MeasId,
measResultServCell SEQUENCE {
rsrpResult RSRP-Range,
rsrqResult RSRQ-Range
},
measResultNeighCells CHOICE {
measResultListEUTRA MeasResultListEUTRA,
measResultListUTRA MeasResultListUTRA,
measResultListGERAN MeasResultListGERAN,
measResultsCDMA2000 MeasResultsCDMA2000,
...
} OPTIONAL,
...
}
MeasResultListEUTRA ::= SEQUENCE (SIZE (1..maxCellReport)) OF MeasResultEUTRA
MeasResultEUTRA ::=SEQUENCE {
    physCellId PhysCellId,
    cgi-Info SEQUENCE {
        cellGlobalId CellGlobalIdEUTRA,
        trackingAreaCode TrackingAreaCode,
        plmn-IdentityList PLMN-IdentityList2 OPTIONAL
    } OPTIONAL,
    measResult SEQUENCE {
        rsrpResult RSRP-Range OPTIONAL,
        rsrqResult RSRQ-Range OPTIONAL,
        Mobilitystate ENUMERATED {High, Medium, Normal}
            OPTIONAL
        ...
    }
}
```

The above-described method for reporting the mobility state aims at the UE in the connection state. As another example of the present invention, before the UE in the idle state enters into the RRC connection state, the UE may evaluate its own mobility state based on a second evaluation parameter sent by the eNodeB through system broadcast and obtain an evaluated second determination result. Further, the UE may report the second determination result to the eNodeB through the RRC Connection Setup Complete message during setting up the RRC connection.

The UE evaluates its own mobility state based on the second evaluation parameter, and obtains the evaluated second determination result. Specific operations will be described as follows.

The UE obtains the number of times of changing cells in preset time periods of $T_{CRmax}$ of a third timer and $T_{CRmaxHyst}$ of a fourth timer, respectively, and compares the obtained number of times with a preset second lower limit times $N_{CR\_M}$ and second upper limit times $N_{CR\_H}$.

If the number of times for the UE to change cells in the time period of $T_{CRmax}$ is greater than the $N_{CR\_M}$ and less than or equal to the $N_{CR\_H}$, it is determined that the UE is in a medium speed mobility state.

If the number of times for the UE to change cells in the time period of $T_{CRmax}$ is greater than the $N_{CR\_H}$, it is determined that the UE is in a high speed mobility state.

If the number of times for the UE to change cells in the time period of $T_{CRmaxHyst}$ is less than or equal to the $N_{CR\_M}$, it is determined that the UE is in a normal mobility state.

The values of the $T_{CRmax}$ and $T_{CRmaxHyst}$ may be configured according to practical requirements, and there is no size relationship between the $T_{CRmax}$ and $T_{CRmaxHyst}$. Of course, their values may also be equal. However, the value of the $N_{CR\_H}$ should be greater than that of the $N_{CR\_M}$.

Preferably, UE may report the determination result obtained by last evaluation to the eNodeB through a RRC Connection Setup Complete message during setting up the RRC connection. Furthermore, an information element Mobilitystate may be added in the RRC Connection Setup Complete message and used to carry the second determination result. Specifically, three cases will be described bellow.

If the second determination result obtained by the last evaluation of the UE is the high speed mobility state, then the Mobilitystate is set to be High.

If the second determination result obtained by the last evaluation of the UE is the medium speed mobility state, then the Mobilitystate is set to be Medium.

If the second determination result obtained by the last evaluation of the UE is the normal mobility state, then the Mobilitystate is set to be Normal.

The new added information element Mobilitystate corresponds to modification in the 3GPP protocol, which is specifically defined as follows:

```
--ASN1START
RRCConnectionSetupComplete::= SEQUENCE{
    rrc-TransactionIdentifier RRC-TransactionIdentifier,
    criticalExtensions CHOICE {
        c1 CHOICE {
            rrcConnectionSetupComplete-r8
            RCConnectionSetupComplete-r8-IEs,
            spare3 NULL, spare2 NULL, spare1 NULL
        },
        criticalExtensionsFuture SEQUENCE{ }
    }
}
RRCConnectionSetupComplete-r8-Ies::=SEQUENCE {
    selectedPLMN-Identity      INTEGER(1...6),
    registeredMME              RegisteredMME OPTIONAL,
    dedicatedInfoNAS DedicatedInfoNAS,
        Mobilitystate ENUMERATED {High, Medium, Normal}
            OPTIONAL
    nonCriticalExtension       SEQUENCE { } OPTIONAL
}
RegisteredMME:= SEQUENCE {
    plmn-Identity       PLMN-Identity OPTIONAL,
    mmegi               BIT STRING(SIZE(16)),
    mmec                MMEC
}
-- ASN1STOP
```

It should be noted that the mobility state reporting method during setting up the RRC connection and the mobility state reporting method in the RRC connection state may be used not only separately but also in combination.

After the UE reports the determination result, including the first determination result and the second determination result, to the eNodeB, the eNodeB may adopt different processing strategies for UEs with different mobility states based on the determination result when performing frequency offset correction, resource scheduling, destination cell handover, etc. For example, if the UE in the Idle state determines that its own mobility state is the high speed mobility state and sets up the RRC connection to report its own mobility state to the eNodeB, then the eNodeB knows that the UE is in the high speed mobility state based on the information element Mobilitystate in the RRC connection setup complete message reported by the UE. Further, the eNodeB uses the frequency hopping technique on the UE in the case where the use of frequency selectivity scheduling can not satisfy UE channel. If handover occurs on the UE, then the eNodeB selects a high speed cell as a destination cell for handover and uses a strategy for correcting large frequency offset to evaluate and correct frequency offset for the UE.

Figure 2:
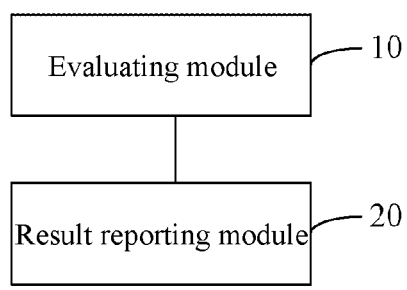
FIG. 2 is a block diagram of a mobile terminal according to the present invention.

In order to implement the above-described method for report the mobility state of the mobile terminal, the present invention further provides a mobile terminal. As shown in FIG. 2, the mobile terminal comprises an evaluating module 10 and a result reporting module 20. The evaluating module 10 is configured to evaluate the mobility state of the mobile terminal under a RRC connection state based on a first evaluation parameter sent by an eNodeB and obtain an evaluated first determination result. The result reporting module 20 is configured to report the first determination result through a measurement report message in the RRC connection state to the eNodeB.

Preferably, the evaluating module 10 is further configured to evaluate the mobility state of the mobile terminal based on a second evaluation parameter sent by the eNodeB through system broadcast before the mobile terminal enters into the RRC connection state and obtain an evaluated second determination result. Accordingly, the result reporting module 20 is further configured to report the second determination result to the eNodeB through a RRC connection setup complete message during setting up a RRC connection.

The result reporting module 20 carries the first determination result by a new added information element Mobilitystate in the measurement report message, and carries the second determination result by a new added information element Mobilitystate in the RRC connection setup complete message.

In sum, the mobile terminal and the mobility state reporting method thereof in accordance with the present invention allow the UE to report the evaluation result for its mobility state to the eNodeB through the measurement report message in the RRC connection state, or allow the UE in the idle state to report the determination result for the mobility state evaluation to the eNodeB through RRC signaling during cell reselection, in order to provide references for the eNodeB to select a processing strategy corresponding to the UE.

The evaluation of the mobility state may use existing configuration parameters, principles and processing procedures in the protocol without bringing extra processing overhead for the UE. Indexes for evaluating the mobility state are parameters configured by the eNodeB. The eNodeB may unify the UE's and eNodeB's understandings for corresponding relationships between the different high, medium and normal mobility states and speed by the parameter configuration.

When cell handover is performed, the prevent invention is beneficial for the eNodeB to select a destination cell for handover with the corresponding speed attribute for UEs with different mobility states so as to assist the eNodeB to implement the consistence between bearing UE type and cell attribute planning When resources are allocated to the UE, frequency selectivity scheduling and frequency hopping techniques are used respectively for UEs with different mobility states so as to satisfy requirements for different channel states. In addition, the prevent invention is beneficial for the eNodeB to adopt different pertinent frequency offset correction methods for UEs with different mobility states.

The forementioned description presents only the preferred embodiments of the present invention, and is not intended to limit the protection scope of the present invention.

What is claimed is:

1. A method for reporting a mobility state of a mobile terminal comprising:

A User Equipment (UE) in an idle state evaluating its own mobility state based on a first evaluation parameter sent by an evolved Node B (eNodeB) through system broadcast before the UE enters into a Radio Resource Control (RRC) connection state, and obtaining an evaluated first determination result; and the UE reporting the first determination result to the eNodeB through a RRC connection setup complete message during setting up a RRC connection;

wherein the UE evaluating its own mobility state based on the first evaluation parameter and obtaining the first determination result comprises:

the UE obtaining a number of times for the UE to change cells in preset time periods of $T_{CRmax}$ of a third timer and $T_{CRmaxHyst}$ of a fourth timer, respectively, and comparing the obtained number of times with a preset second lower limit time $N_{CR\_M}$ and second upper limit time $N_{CR\_H}$;

when the number of times for the UE to change cells in the time period of $T_{CRmax}$ is greater than the $N_{CR\_M}$ and less than or equal to the $N_{CR\_H}$, determining that the UE is in a medium speed mobility state;

when the number of times for the UE to change cells in the time period of $T_{CRmax}$ is greater than the $N_{CR\_H}$, determining that the UE is in a high speed mobility state; and when the number of times for the UE to change cells in the time period of $T_{CRmaxHyst}$ is less than or equal to the $N_{CR\_M}$, determining that the UE is in a normal mobility state.

2. The method according to claim 1, further comprising: the UE carrying the first determination result by a new added information element Mobilitystate in the RRC connection setup complete message, wherein:

when the first determination result obtained by last evaluation is the high speed mobility state, then the Mobilitystate is set to be High;

when the first determination result obtained by last evaluation is the medium speed mobility state, then the Mobilitystate is set to be Medium; and when the first determination result obtained by last evaluation is the normal mobility state, then the Mobilitystate is set to be Normal.

3. The method according to claim 1, wherein after the UE reports the determination result to the eNodeB, the method further comprises: the eNodeB adopting different processing strategies for UEs in different mobility states based on the determination result when performing frequency offset correction, resource scheduling, destination cell handover.

4. The method according to claim 1, further comprising: the UE carrying the first determination result by a new added information element Mobilitystate in the RRC connection setup complete message, wherein:

when the first determination result obtained by last evaluation is the high speed mobility state, then the Mobilitystate is set to be High;

when the first determination result obtained by last evaluation is the medium speed mobility state, then the Mobilitystate is set to be Medium; and when the first determination result obtained by last evaluation is the normal mobility state, then the Mobilitystate is set to be Normal.

5. The method according to claim 1, further comprising:

the UE evaluating its own mobility state under the RRC connection state based on a second evaluation parameter sent by the eNodeB, and obtaining an evaluated second determination result; and the UE reporting the second determination result to the eNodeB through a measurement report message in the RRC connection state.

6. The method according to claim 5, wherein the UE evaluating its own mobility state based on the second evaluation parameter and obtaining the second determination result comprises:

the UE obtaining the number of times of changing cells in preset time periods of t-Evaluation of a first timer and t-HystNormal of a second timer, respectively, and comparing the obtained number of times with a preset first lower limit times n-CellChangeMedium and first upper limit times n-CellChangeHigh;

when the number of times for the UE to change cells in the time period of t-Evaluation is greater than the n-CellChangeMedium and less than or equal to the n-CellChangeHigh, determining that the UE is in a medium speed mobility state;

when the number of times for the UE to change cells in the time period of t-Evaluation is greater than the n-CellChangeHigh, determining that the UE is in a high speed mobility state; and when the number of times for the UE to change cells in the time period of t-HystNormal is less than or equal to the n-CellChangeMedium, determining that the UE is in a normal mobility state.

7. The method according to claim 5, further comprising:
the UE carrying the second determination result by a new added information element Mobilitystate in the measurement report message, wherein:

when the first determination result obtained by current evaluation is the high speed mobility state, then the Mobilitystate is set to be High;

when the first determination result obtained by current evaluation is the medium speed mobility state, then the Mobilitystate is set to be Medium; and when the first determination result obtained by current evaluation is the normal mobility state, then the Mobilitystate is set to be Normal.

8. A mobile terminal comprising:

an evaluating module configured to evaluate a mobility state of the mobile terminal in an idle state based on a first evaluation parameter sent by an eNodeB through system broadcast before the mobile terminal enters into a Radio Resource Control (RRC) connection state and obtain an evaluated first determination result and evaluate the mobility state of the mobile terminal under the RRC connection state based on a second evaluation parameter sent by the eNodeB and obtain an evaluated second determination result; and a result reporting module configured to report the first determination result to the eNodeB through an RRC connection setup complete message during setting up a RRC connection and report the second determination result to the eNodeB through a measurement report message in the RRC connection state;

wherein the result reporting module is further configured to carry the second determination result by a new added information element Mobilitystate in the measurement report message and carry the first determination result by a new added information element Mobilitystate in the RRC connection setup complete message.

9. The mobile terminal according to claim 8, wherein the result reporting module is further configured to carry the second determination result by a new added information element Mobilitystate in the measurement report message and carry the first determination result by a new added information element Mobilitystate in the RRC connection setup complete message.

10. The mobile terminal according to claim 8, wherein the evaluating module is further configured to obtain the number of times of changing cells in preset time periods of $T_{CRmax}$ of a third timer and $T_{CRmaxHyst}$ of a fourth timer, respectively, and compare the obtained number of times with a preset second lower limit times $N_{CR\_M}$ and second upper limit times $N_{CR\_H}$;

when the number of times to change cells in the time period of $T_{CRmax}$ is greater than the $N_{CR\_M}$ and less than or equal to the $N_{CR\_H}$, determining that the mobile terminal is in a medium speed mobility state;

when the number of times to change cells in the time period of $T_{CRmax}$ is greater than the $N_{CR\_H}$, determining that the mobile terminal is in a high speed mobility state; and when the number of times to change cells in the time period of $T_{CRmaxHyst}$ is less than or equal to the $N_{CR\_M}$, determining that the mobile terminal is in a normal mobility state.

* * * * *